A. F. ROCKWELL.
CONNECTION FOR VEHICLE WHEELS.
APPLICATION FILED OCT. 19, 1905.
962,247.
Patented June 21, 1910.
2 SHEETS—SHEET 1.
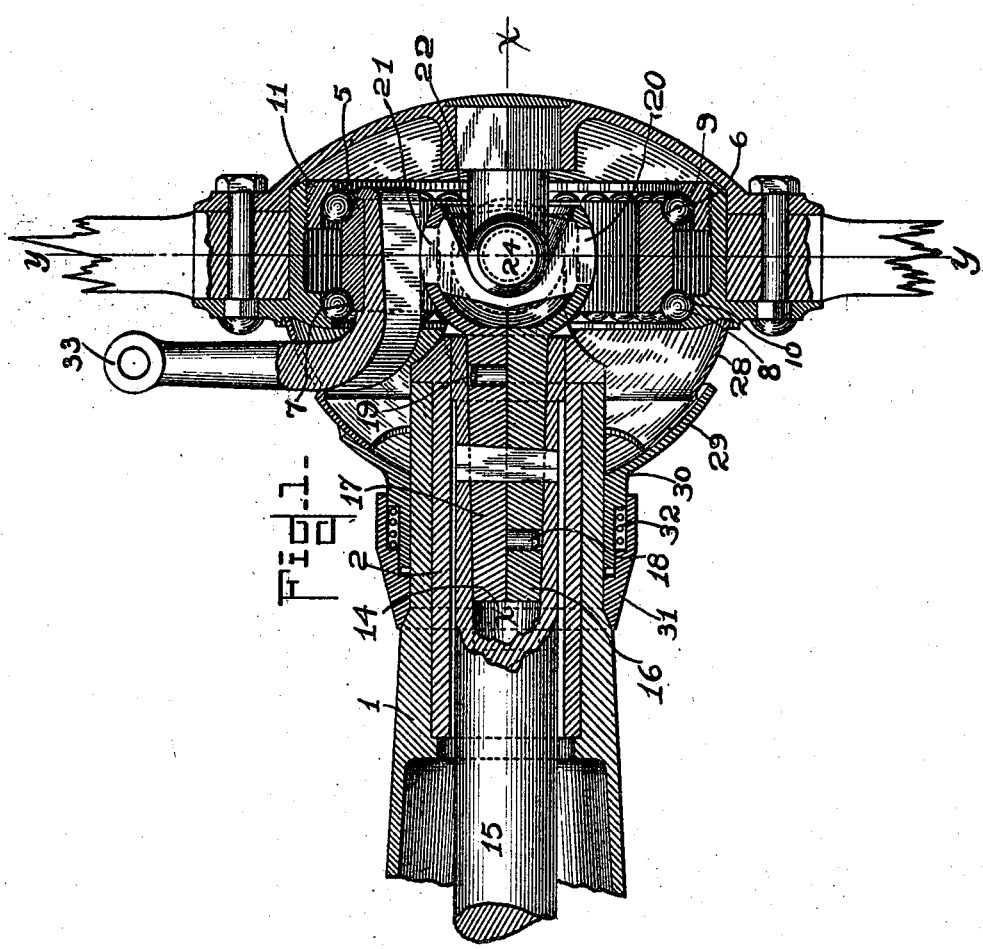
WITNESSES:
Chas B Crocker
B. J. Fink
Albert F. Rockwell
INVENTOR.
BY Gales Moore
ATTORNEY.

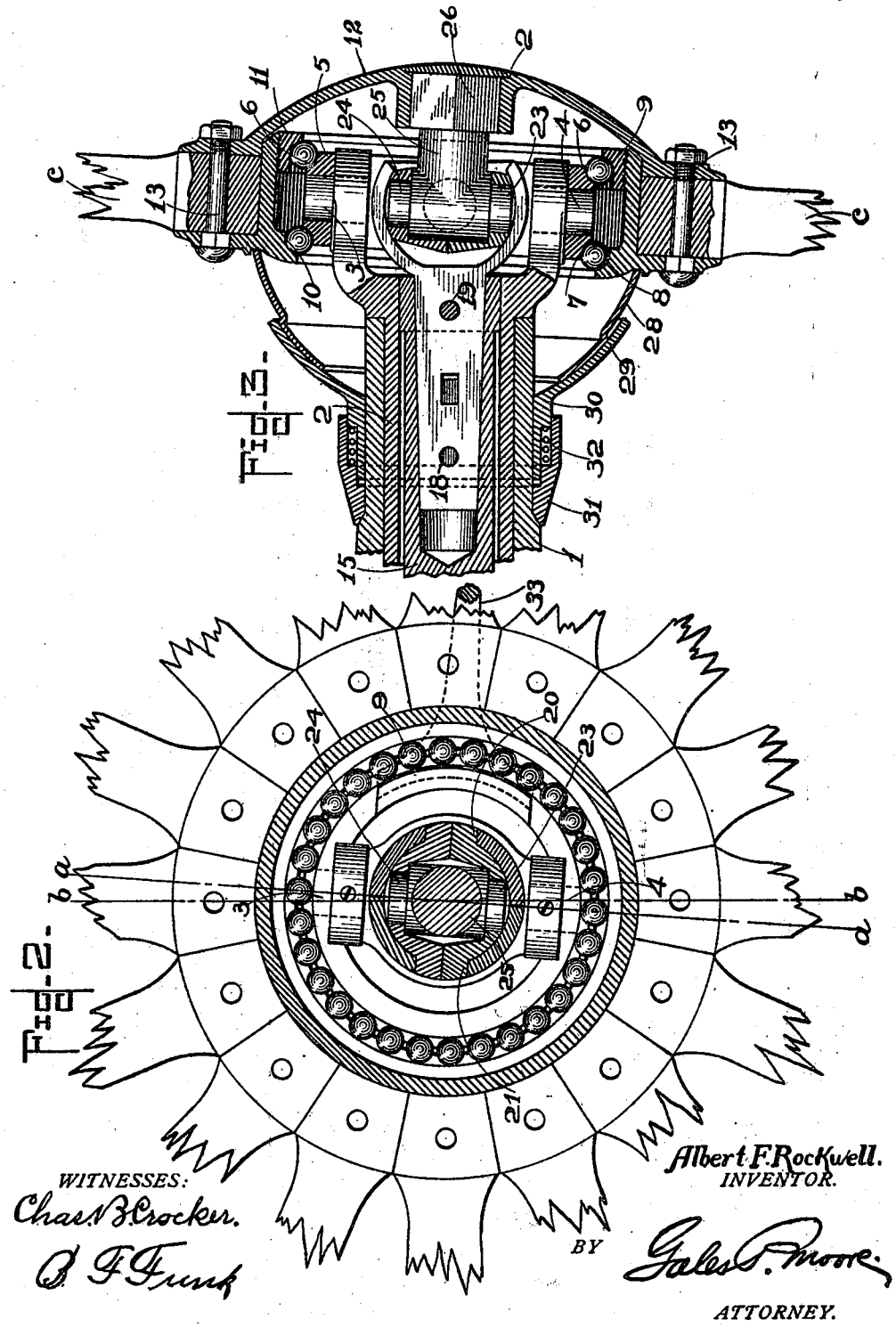

UNITED STATES PATENT OFFICE.

ALBERT F. ROCKWELL, OF BRISTOL, CONNECTICUT, ASSIGNOR TO THE NEW DEPARTURE MANUFACTURING COMPANY, OF BRISTOL, CONNECTICUT, A CORPORATION OF CONNECTICUT.

CONNECTION FOR VEHICLE-WHEELS.

962,247.

Specification of Letters Patent.   Patented June 21, 1910.

Application filed October 19, 1905.   Serial No. 283,475.

*To all whom it may concern:*

Be it known that I, ALBERT F. ROCKWELL, a citizen of the United States, residing at Bristol, county of Hartford, State of Connecticut, have invented a certain new and useful Connection for Vehicle-Wheels, of which the following is a full, clear, and exact description, such as will enable others skilled in the art to which it appertains to make and use the same, reference being had to the accompanying drawings, forming part of this specification.

This invention relates to vehicle wheels and particularly to a manner of connecting the same to an axle or journal carried by the vehicle running gear.

One of the objects of the invention is to provide means whereby the normal tendency of the wheel will be to automatically maintain parallelism between the longitudinal center of the vehicle and the wheels.

Another object of the invention is to provide means for permitting the coöperating parts of the axle and wheel to be easily disassociated for inspection, repairs or for other purposes, as well as to permit of an easy, rapid reorganization of the parts when they are being assembled.

Another object of the invention is to provide means for preventing the introduction of dust, dirt or other foreign substances within the hub so that the liability of deterioration due to contact of foreign matter with the axle or interior of the hub will be reduced to a minimum, if not wholly avoided.

It is also the purpose of my invention to provide efficient means for preventing the annoyance caused by the wheels being thrown out of angle to the longitudinal center of the vehicle when the vehicle is moving on a straight course and thereby causing the vehicle to deviate from the desired course which the operator desires it to follow. In other words, it is an important feature of my invention to provide means so that the wheel will properly "track" or follow a straight course, an advantage which has been desirable particularly in motor vehicles, but which, so far as I am at present informed, has not heretofore been accomplished.

With the usual construction of motor vehicles, the operator finds that constant attention must be given to the steering mechanism in order to prevent the vehicle "playing off" from one side to the other. This so-called "playing off" is due to many causes, for example, as is well known, the vehicle wheel must have a certain amount of pivotal play and should one or more of the wheels strike any inequality on the road, such as a stone or rut or the like, the natural tendency of the wheel to avoid passing over this inequality will impart a horizontally pivotal motion to the wheel and thereby destroy the parallelism between the longitudinal center of the vehicle and the wheels, causing the vehicle to swerve either to one side or the other and this swerving is liable to prove serious, unless constant attention is given to the steering mechanism by the operator so as to rectify any tendency of the vehicle to "play off" as it is being driven. In motor vehicles usually provided heretofore it has been found that the wheels have a tendency to "play off" even on an even roadway. The theory for explaining this "playing off" is that it is due to the manner of gearing up the machine, causing more or less back-lash which is usually present in all of the motor vehicles heretofore existing, and it is obvious that the slightest deviation of the wheels from a straight course will cause a considerable swerve of the vehicle from one side to the other, particularly when the motor vehicle is driven at a high speed. With the construction and arrangement of wheel and connection embodying the principle involved in my invention, I aim to overcome this serious disadvantage in a simple and efficient manner so that the tendency of the wheel to maintain the parallelism with the longitudinal center of the vehicle body will be in excess of any tendency which might normally be exerted thereupon to destroy the parallelism; therefore, in steering the vehicle the operator must exercise pressure upon the wheel steering arms in order to permit the vehicle to describe an arc. I have illustrated the simplest form known to me at the present time of accomplishing the desired result, but it is apparent that in actual practice I might find it desirable to eliminate immaterial details without affecting the efficiency of my invention.

In the drawings, Figure 1 is a horizontal sectional view of the wheel hub, the mechanism by which it is attached to the axle, parts being shown at an elevation. Fig. 2 is a vertical cross sectional view on the line $y$—$y$ of Fig. 1, and Fig. 3 is a longitudinal vertical sectional view on the line x—x of Fig. 1.

In order to illustrate the preferred form of my invention, I have disclosed it as being applied to a motor vehicle having an axletree 1, which carries a rigid sleeve 2 within the tree, said sleeve being formed with a forked end portion or head, carrying trunnions 3 and 4 respectively, whereby said sleeve may support an annulus or ring 5, having openings into which the trunnions 3 and 4 pass, said annulus or ring 5 being permitted to have approximately a horizontal swing. The annulus 5 is provided with a suitable number of ball races, in the present instance two, designated by the numerals 6 and 7, to receive the balls 8 and 9. These balls are confined in their races by the cups 10 and 11, one screwed within the other, so that the balls may be readily assembled with the coöperating mechanism and removed when it is desired. One of the cups, preferably the one 10, is provided with a peripheral flange coöperating with a disk or plate 12 to assist in maintaining the spokes in their relative positions, said spokes being secured in place by suitable fastening devices, as for example, by the bolts 13, which pass through the flange on the ring 10 and the plate 12. The plate 12 consists of what might properly be termed a cap piece, in that it incases the outer portion of the mechanism for connecting the wheel to the axle and prevents the introduction into the hub of dust, dirt and other foreign elements.

Within the sleeve 2 is a hollow end 14 of the axle 15, which hollow portion is preferably slightly tapered to receive the tapered ends of the split socketed member for holding the universal joint for connecting the wheel to the axle. This socketed member is illustrated as comprising two parts, designated by reference numerals 16 and 17 and each part is illustrated as comprising a tapered shank with an approximately semispherical socket, so that when the two parts are assembled and pins 18 and 19 are caused to connect the two parts together, an approximately semi-spherical socket is provided for the reception of the trunnions 20 and 21 of the sectional socket member 22. This socketed member 22 also receives trunnions 23 and 24 on the T shaped coupling 25, which is provided with a polygonal member 26 fitting in the correspondingly shaped socket 27 on the cap piece 12.

The inner side of the mechanism included within the hub of the wheel is protected by a flexible guard, comprising the bulged ring 28, whose edge bears against the peripheral flange of the cup 10, its opposite portion being overlapped by the flared flange 29 on the sliding collar 30, carried by the axletree, and between the collar 30 and the rigid collar 31 is a coil spring 32, whose expanding force has a tendency to cause the flexible dust guard to bear against the wheel hub and thereby avoid any liability of the introduction into the hub of any foreign substances.

As heretofore explained, it is the purpose of my invention to maintain parallelism between the longitudinal center of the vehicle and the wheels. By reference to Fig. 2 it will be observed that the trunnions 3 and 4 are slightly off a perpendicular line drawn through the axis of the wheel hub. In other words, the line a—a drawn through the axis of the trunnions is at an angle to the line b—b drawn perpendicularly through the axis of the axle. The upper trunnion 3 is illustrated as being slightly out of line with its lower trunnion 4, as will be seen by inspecting the line c—c, Fig. 3. The trunnions 20, 21 and 23 and 24 are also arranged at angles to a vertical or horizontal line drawn through the axis of the axle, as will be observed by reference to Fig. 2.

The wheel will be driven in the following manner: Power being applied to the axle 15, the socketed member comprising the parts 16 and 17 will be rotated and as this member carries the coupling 25, said coupling will be rotated, causing the cap piece 12 to rotate, and inasmuch as this cap piece is connected to the cup 10 and the spokes forming in effect part of the hub, the whole wheel will be caused to rotate around the ring 5, which while being capable of partaking of horizontally swinging movement is not capable of rotating.

By careful inspection of the drawings together with the description accompanying this application, it will be apparent that in view of the fact that the bearings on which the wheel is capable of swinging horizontally, are out of vertical alinement so that a line drawn through the centers will be tangent to the axis of the axle, the weight on the wheel and the tractional contact of the wheel with the roadbed will be in rear of the pivotal center of said wheel so that the natural tendency of the wheel to travel in the path parallel to this direction of movement will be assured. In other words, if for any cause the wheel deviates from a straight line, it will have a tendency to automatically resume its proper position without aid from any contrivance or mechanism and the necessity for constant attention to prevent the vehicle from "playing off" from one side to the other will be reduced to a minimum, if not wholly eliminated. Of course it will be necessary to cause the wheel to swing at an angle to the longitudinal center of the vehicle in describing an arc, as for example, in turning a corner. This may be accomplished by appropriate mechanism connected to the steering arm 33 fast to the ring 5. However, when pressure is taken from the arm 33 the wheel will have a tendency to resume its proper position as heretofore explained. The natural tendency of the wheel to resume the proper position will be augmented by the peculiar manner of hanging the T coupling so that the portion of the wheel on the roadbed will be nearer the longitudinal center of the vehicle than the upper portion thereof.

From the foregoing it will be apparent that I have not only overcome one of the serious disadvantages heretofore present to vehicles, but by utilizing a construction similar to the one heretofore described, the several parts included in the mechanism may be conveniently assembled or disorganized with but little skill and requiring no special make of tools, and, therefore, the necessity for the services of a skilled machinist in making repairs will be minimized.

What I claim is:

1. The combination with a hollow driving axle, and a wheel, of a two-part socket member each element of which has a stem received in said axle and has also a head provided with a socket, a two-part connector each of whose elements has a socket and also has a trunnion portion received in the said sockets of said socket member, and a second connector in driving connection with said wheel and having trunnions received in said sockets of said two-part connector; substantially as described.

2. A dust cap, comprising a recessed collar, a socket member, a sleeve on the socket member loosely received in the recess in the collar, yielding means interposed between the collar and the sleeve for forcing the sleeve out of the collar, and a guard movably supported by the socket member.

In testimony whereof, I hereunto affix my signature, in the presence of two witnesses.

ALBERT F. ROCKWELL.

Witnesses:
   JOSEPH D. BROWN,
   DE WITT PAGE.